Patented Aug. 29, 1950

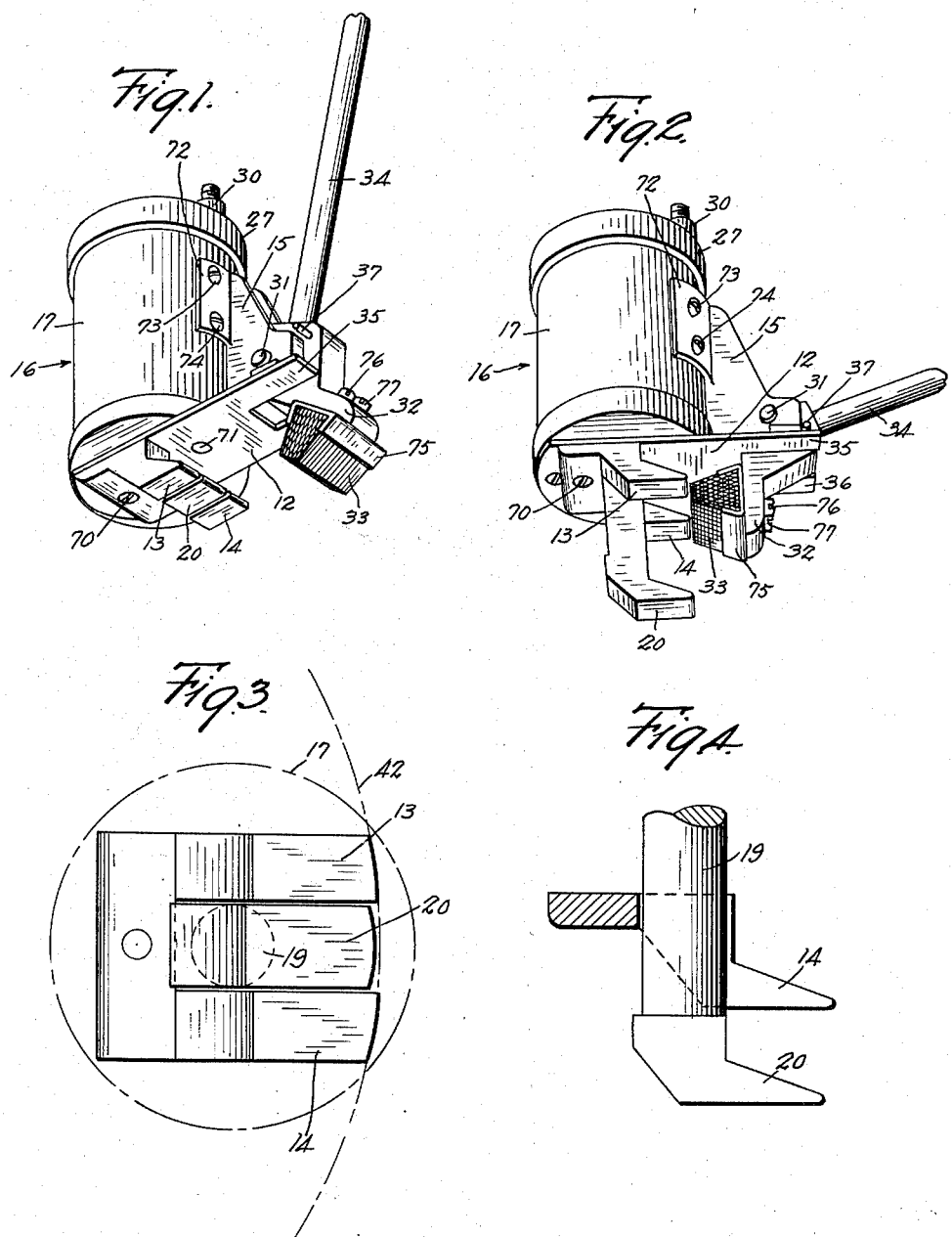

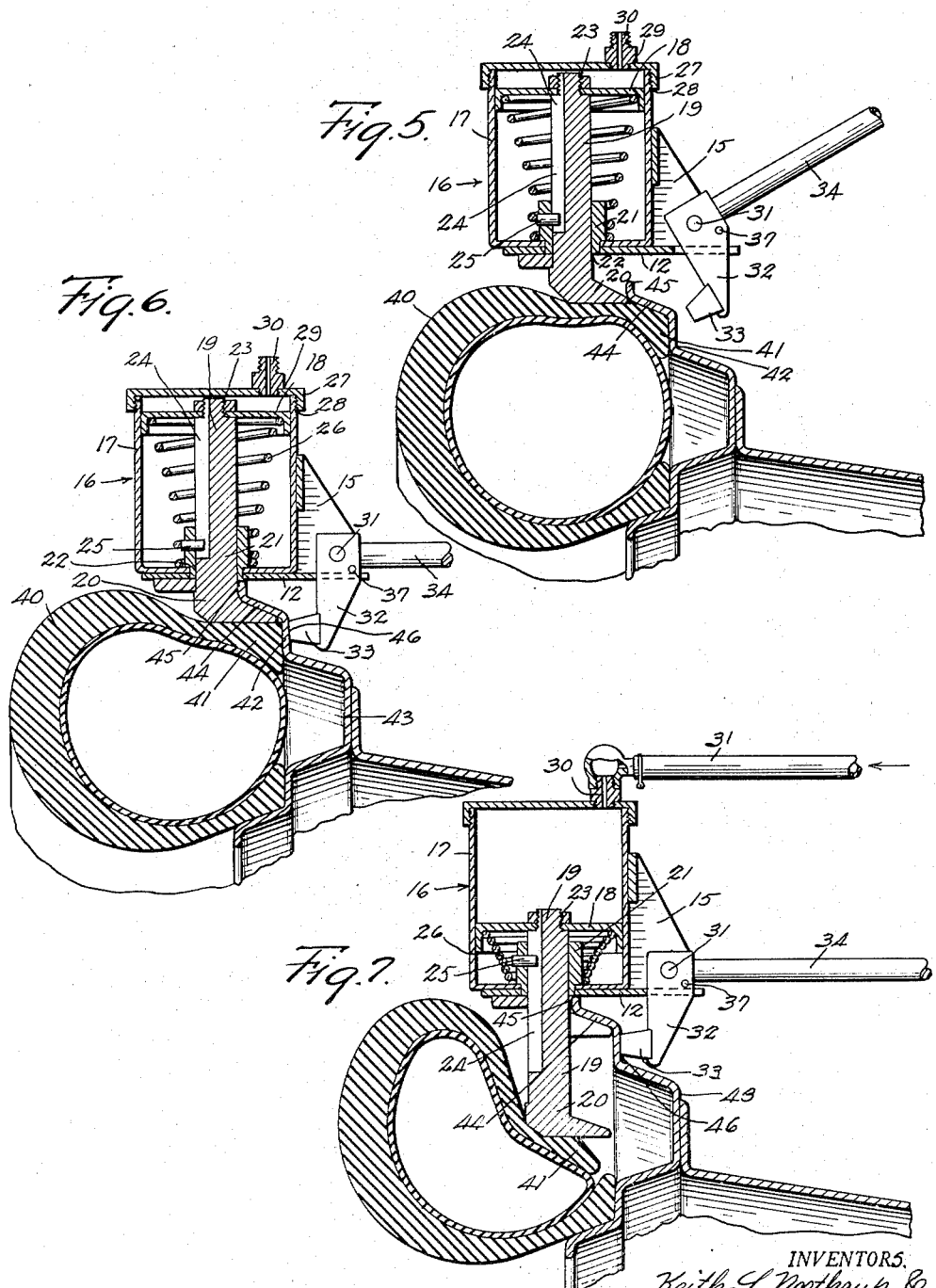

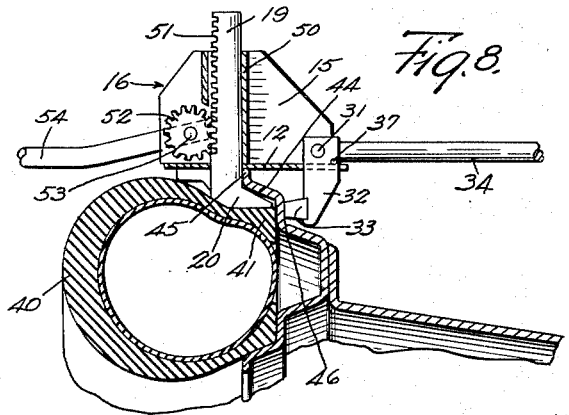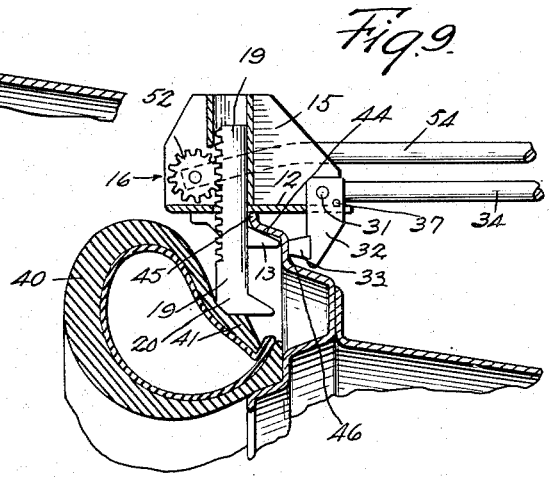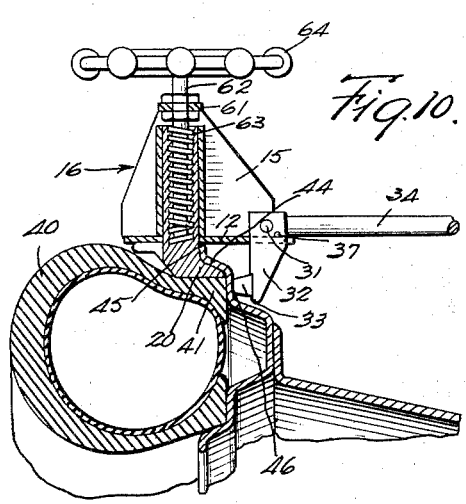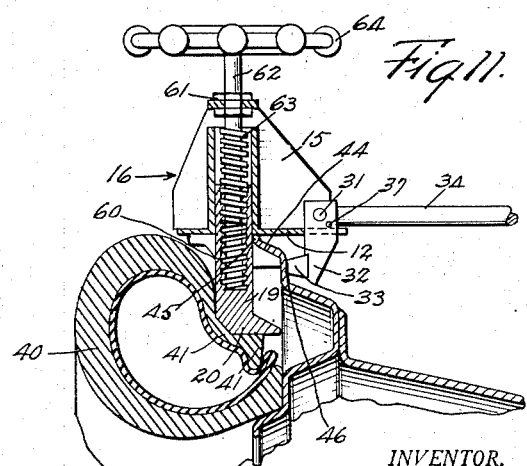

2,520,330

UNITED STATES PATENT OFFICE 2,520,330

TIRE LOOSENING TOOL

Keith L. Northrup and Reynold T. Hedfield, Madison, Wis.

Application April 1, 1947, Serial No. 738,628

7 Claims. (Cl. 157—1.17)

The present invention relates to improvements in tire loosening tools.

The invention concerns itself with an improved form of tire loosening tool particularly useful for loosening the bead of a tire from the flange and base of a rim upon which it is mounted.

The loosening of tires from the rims upon which they are mounted has always presented considerable difficulties, and a great many devices have been devised and patented which have for their aim the facilitation of this disagreeable task.

With the gradual disappearance of the so-called clincher rim, and the almost universal adoption of the type of rim which has a flange against which the outer side of the bead of a tire abuts, the removal of the tire has been somewhat facilitated. But particularly because of the much longer wear of tires today than in the past, sometimes a year or more elapses before it is necessary to remove a tire from the rim. This is particularly true as nowadays most cars are equipped with an extra wheel or at least an extra rim, so that the entire rim or wheel can be changed in case of a blowout or flat.

Car operators usually wait until they can get to a garage to have the tires fixed. This is usually accomplished with the rim or wheel removed from the car and with the wheel or rim and the tire thereon lying in a horizontal position. The usual procedure adopted by the ordinary garage mechanic is to insert some kind of a tire tool between the flange and the bead of a tire and then manually to pull and pry by means of such a tool. Inasmuch as the bead of the tire is usually adhered to or stuck to the base of the rim, this operation very seldom suffices to loosen the tire from the rim, and it is the customary practice to pound upon the side of the tire with a heavy mallet or sledge in an attempt to loosen the bead from the rim. Inasmuch as the bead itself is protected by the flange or the rim, the blows almost always are directed against the relatively more vulnerable sides of the tire, much to their detriment, and many blow-outs have been traced to injury which has been done to a tire by this injurious pounding upon the side walls thereby breaking the fabric and ultimately ruining the tire.

Many rather ingenious devices have been constructed in the form of complicated machines which attempt to accomplish the rapid removal of the tire from the rim but most of these are too cumbersome readily to be carried about and certainly are of a type which does not lend itself to carrying in a car.

In contrast with prior art devices, the tool of the present invention is light and portable and may readily be carried in the rear compartment of a car or may be hung up on the wall of a garage or repair shop. In its preferred embodiment it depends upon utilization of air pressure which is almost always available in a garage or tire shop, as the air is used for inflating the inner tube of the tire after the repairs have been made.

Accordingly it is one of the objects of the present invention to provide an improved tire tool which is provided with tire-bead loosening bars or fingers which may be initially drawn into the space between the bead and the flange of the rim whereafter the inserted parts are caused to move laterally to force the bead from the rim.

A further object is to provide a tool containing bars or fingers which serve, respectively, to bear against the inner side of a tire rim and the bead of a tire, so that the rim and bead may readily be forced apart, and the tire thus loosened to permit of its complete removal from the rim.

A further object is to provide a hand tool for loosening tires from rims, in which a part of the operation is effected by compressed air.

Other objects of the invention will become apparent from the further description to follow.

The improved tire tool of the present invention comprises a head provided with three gripping fingers which are insertable between the bead and the flange of the rim, and a clamping member carrying a resilient abutment which bears against the outer surface of the base of the rim, the actuation of the clamping member drawing the fingers clear down to the base of the rim. One of the fingers is movable relative to the other two, the movable finger being pushed by means of an operating rod or plunger in a direction away from the flange of the rim and hence against the bead of the tire, thus pushing it laterally away from the flange and along the inner surface of the base of the rim, thereby loosening it therefrom.

The invention is illustrated in a number of forms on three sheets of drawings forming a part of the present specification, in which drawings:

Fig. 1 is a perspective view of a preferred embodiment of the present invention, shown in a wide open position, ready for use;

Fig. 2 is a perspective view showing the preferred embodiment of the present invention in the position it will assume when clamped on the rim of a tire and when the latter has been pried away from the flange of the rim;

Fig. 3, on a somewhat enlarged scale, is a bottom plan view of the tire loosening tool, showing the bead-loosening fingers;

Fig. 4, on the same scale as Fig. 3, is a side-elevational view of the fingers when in their separated, tire-pushing position;

Fig. 5 is a vertical sectional view through the preferred form of the tool, showing the initial position of its method of use;

Fig. 6 is a view similar to Fig. 5, showing the next position assumed by the tool when in use;

Fig. 7 is a view similar to Fig. 5, showing the final position assumed by the tool when in use;

Fig. 8 is a vertical sectional view of a modified form of the tool, in the second position when in use;

Fig. 9 is a view similar to Fig. 8, with the tool shown in the final position;

Fig. 10 is a vertical sectional view of a further modified form of the tool, in the second position when in use; and Fig. 11 shows the same tool as that shown in Fig. 10, but in the final position.

All forms of the invention have certain elements in common, namely the means for initially forcing the fingers between the flange of the rim and the bead of the tire, and means for pushing one of the fingers against the bead. While the form shown in Figs. 1–7 is operated by fluid pressure, the forms shown in Figs. 8–11 are entirely manually operated.

So far as the various modifications have parts in common, the tool comprises, essentially, a supporting member, which may take the form of a base plate 12 which serves to support the two stationary gripping fingers 13 and 14, which are secured to the base plate by means such as welding; or they may be forged from a single piece of metal as part of said plate. Secured to the other side of the base plate 12 there is a vertically extending flange 15 which serves to support the pushing mechanism, broadly designated on all pertinent figures by the reference numeral 16. This pushing mechanism is essentially a hydraulic cylinder as shown in the modifications illustrated in Figs. 1, 2, 5, 6 and 7, but is a mechanical device as shown in Figs. 8, 9, 10 and 11.

Referring now to the preferred form of the present invention, as illustrated in Figs. 1 through 7, there may be secured to the base plate 12, a pneumatic cylinder 17 containing a piston 18 which is secured to the operating or thrusting stem 19 of the intermediate movable gripping-finger 20. The stem 19 passes through a suitable guide and stop 21 located within the cylinder 17 and also through a suitable opening 22 in the base plate 12. The piston 18 is secured to the stem 19 by being threaded thereinto at 23. The stem 19 is also provided with a laterally extending guide slot 24, a pin extending through the stop 21 into the guide slot 24.

A suitable conical helical spring 26 surrounds the stem 19 and bears with its upper end against the under side of the piston 18 and with its other end against the bottom of the cylinder 17, the lowermost convolution surrounding the stop 21. The piston is provided with a flanged closure-member 27 which is threaded at 28 on to the upper end of the externally threaded cylinder 17. In this end member 27 there is inserted, through a suitable threaded opening 29, a nipple 30 which serves for the attachment to an air hose 31 as seen in Fig. 7.

The gripping fingers 13, 14 and 20 are preferably flat on the bottom, but their upper sides are backwardly slanted at about a 20 degree angle, as best seen in Figs. 1, 2 and 4. Moreover, the movable finger 20 is slightly shorter than the fingers 13 and 14, the reason for which will become apparent from a further description of the tool and its manner of use.

A clamping member 32 is pivotally connected to the vertical flange 15, being provided at the end intended to contact the rim with a resilient pad or grip 3, which may be made of rubber.

Also secured to the clamping member 32 is the operating handle 34. The clamping member 32 passes between the bifurcated ends 35 and 36 of the base plate 12, as may best be seen on the perspective view shown in Figs. 1 and 2. A stop 37, extending through a portion of the clamping member, is of sufficient length to bridge the bifurcated ends 35 and 36 of the base-plate 12 so as to limit the extent to which the clamping member may swing on its pivot 31. Therefore the force exerted upon the handle 34 will be transferred to the entire base-plate. The value of this will be explained in connection with the operation of the tire tool.

In using the tool (irrespective of the particular form used) the initial steps are always the same. Thus the tool may be placed so that it will assume the position shown for instance in Fig. 5 (this is true of all modifications) so that the gripping fingers 20, 13 and 14 will lie with their bottom against the side wall of the tire 40, immediately above the bead 41 thereof.

By moving the operating handle 34 downwardly, thus swinging the clamping member 32 about its pivot 31, the rubber pad 33 will be brought into contact with the outer portion 42 of the tire rim 43, whereupon by further pushing downwardly against the handle 34, the fingers 13, 20 and 14 will be forced between the flange 44 of the rim 43 and the bead 41 of the tire so that the tool will assume the position illustrated in Figs. 6, 8 and 10. At that time the three fingers 13, 20 and 14 will be, so far as their undersides are concerned, in the same plane, all of them abutting against the bead 41 of the tire. The two stationary fingers 13 and 14 as well as the movable finger 20 will thus abut against the flange 44 with their sloping surfaces. The force exerted by the handle 34 will thus also be imparted to the supporting member or base plate 12, so that the same will bear with considerable force against the outer edge of the flange 44 along the line 45, while the pad 33 will bear against the outside of the bottom of the rim at 46. This will offset any tendency for the tool to move out of engagement with the rim, and will hold the ends of the fingers 13 and 14 tightly against the inner bottom of the rim, substantially opposite the pad 33. The rim is thus tightly gripped between this pad 33 and the ends of fingers 13 and 14. Finger 20, however, is somewhat shorter than the other two and hence will not abut against the bottom of rim 43 at 42, and hence will be free to move against the bead 41 of the tire 40.

If the stem 19 is now moved relative to the base plate 12, it will move downwardly against the bead 41 of the tire, eventually assuming the position shown in Figs. 2, 7, 9 and 11.

Specifically referring to the pneumatic form of the tool, which is the preferred type as illustrated in Figs. 1 through 7, and assuming the tool to be in the position illustrated in Fig. 6, the air hose 3 is applied to the nipple 30 thereby forcing air under pressure into the cylinder 17, as a result of which the piston 18 will move downwardly, thereby compressing the spring 26. At the same time the thrusting member or stem 19 will move downwardly carrying with it the finger 20, which thus forces the bead 41 away from the flange 44 of the rim 43. This third or final position relative to the pneumatic form of the tool is shown in Fig. 7. It will thus be seen that the force exerted by the finger 20 and the fingers 13 and 14 will be against the bead 41 on the one hand and against the flange 44 on the other, so that there will be no tendency for the tool to slip out of position even though considerable pressure be applied. Moreover, the pressure is not against the side wall of the tire but against the heavily reinforced bead, which usually also contains therein imbedded wires and other reinforcing means so that there is no danger of injuring the tire in any way by thus exerting the force. It has been found in actual practice that about 1500 pounds is necessary to force a tire from a rim when the same has been on for about a year, and has been more or less cemented thereon, this being particularly true of the so-called "safety-rims" now widely in use.

After the tire has thus been loosened, the air pressure is released, whereby, under the influence of the spring 26, the piston will resume the position shown in Figs. 5 and 6, whereafter by lifting the handle 34 the tool can be completely disengaged from the rim and tire and moved to a new position when the series of operations hereinabove described will be repeated as many times as may be necessary completely to loosen the tire from the rim. When tires have been on the rim for a long time, it may be necessary to operate also on the opposite side of the rim and tire, which manner of operation will of course be immediately obvious from the description hereinabove.

Referring now more specifically to the modified forms of the invention, one method of constructing the tool comprises the use of a rack and pinion for advancing the finger 20. This construction is illustrated in Figs. 8 and 9. In this modification the air cylinder 17 is omitted and there is secured to the upstanding flange 15, which is attached to the base-plate 12, a therefrom vertically extending guide 50 through which slides the stem 19, which, in place of the guide slot 24 shown in the previously described modification, now carries a rack 51, the teeth of which are engaged by the pinion 52 which is pivoted by means of a pin 53 to the oppositely extending continuation of the flange 15. A suitable operating handle 53 is keyed to the gear 52 so that it may be rotated about its pivot 53 about 180°. With the tool in the second position, as shown in Fig. 8, and with the pinion 52 in engagement with the rack 51 with the gripping finger 20 in its retracted position, the handle 54 is swung about 180° so that it will be brought into the position shown in Fig. 9, as a result of which movement of the pinion 52 the stem 19 will be moved into the position shown in said figure, thereby pushing the bead of the tire away from the rim in exactly the same manner as has previously been described in connection with the other figures, the only difference being that in the present modification mechanical force is used instead of air pressure.

In the third modification, illustrated by Figs. 10 and 11, a screw is used to accomplish the movement of the finger 20, which for that purpose is made internally hollow, being internally threaded at 60 (see Fig. 11). The flange 15 carries a suitable supporting member 61 at a point opposite the finger 20, and thus serves to support the stem 62 of a screw 63 which has threads which are in engagement with the internal threads 60 of the hollow stem 19.

A suitable hand wheel 64 is keyed to the stem 62 so that the latter may be rotated. When the tool is in the position shown in Fig. 10 (the so-called second position), the threads on the stem 62 will be in complete engagement with the threads 60 of the stem 19. However, by rotating the hand wheel 64 in the appropriate direction, depending upon whether it is a right or left handed thread, the stem 19 will be forced downwardly so that the finger 20 will be forced against the bead 41 of the tire 40 in exactly the same manner as has been already fully described, the only difference being in this case that the mechanical advantage of a screw is employed instead of the rack and pinion construction of Figs. 8 and 9, or the preferred pneumatic cylinder 17 and cooperating piston 18 and other parts as illustrated in Figs. 1 through 7.

The entire tool is quite compact and can readily be carried in the trunk or tool box of a motor car or truck, and thus will be available when needed.

For occasions when it is contemplated that tire repairs may have to be effected away from a garage provided with compressed air or other working fluid, the mechanical modifications shown in Figs. 8 through 11 may prove more suitable, although for most purposes, and particularly for use in garages, the pneumatically operated device shown in Figs. 1 through 7 is preferred. It will of course be obvious that hydraulic fluid under pressure such as water or oil may be used instead of air pressure to force the piston 18 down against the spring 26 in the cylinder 17. The cylinder 17 is preferably secured to the base plate 12, for example, by means of screws 70 and 71 (Figs. 1 and 2), and the cylinder 17 may be attached to the flange 15 by a curved flange 72 secured to the cylinder 17 by screws 73 and 74, and two corresponding screws in the opposite side of the flange 15, which are invisible in the drawings.

It will also be obvious that welding or other means of attaching the various parts may be resorted to. Thus purely for purposes of example, the resilient pad 33 is shown being housed in the inwardly bent channel 75 which latter is secured to the clamping member 32 by a plurality of screws 76 and 77, (shown only in Figs. 1 and 2), but here again there is considerable choice in the manner of construction, and any other convenient method of assembling the tool is to be construed as within the scope and purport of the present invention.

The exact shape and orientation of the various parts is of course open to considerable modifications, and any mechanical equivalents which will readily occur to those skilled in the art into which this invention falls are to be construed as within the scope thereof.

The device may be constructed of iron or steel or preferably of some of the light-weight metals such as aluminum or magnesium or their various alloys.

Applicants claim:

1. A tire-loosening tool comprising a substantially flat base-plate, two spaced tire-loosening fingers affixed to one side thereof, a pneumatic cylinder and piston secured to the other side of said base plate and a thrust-member secured to said piston and slidable through an opening in said base-plate to the first-mentioned side into position between said fingers, a tire-loosening finger of substantially the same shape as the first-mentioned fingers but slightly shorter affixed to said thrust-member; means pivotally supported on said base plate for drawing all of said fingers into position between the flange of a tire-rim and a tire mounted thereon, said pivotally supported means carrying a clamping head having a resilient contacting surface adapted frictionally to engage the outer surface of the bottom of the rim when said fingers are in position between the bead and the flange, an operating handle on said pivotally mounted means, and stop means on said last mentioned means to limit the movement of said operating handle to permit forcing the base-plate tightly against the inner edge of the flange of the rim.

2. A tire-loosening tool comprising a substantially flat base-plate, rigid tire-loosening fingers secured to one side thereof, at least one movable tire-loosening finger intermediate said rigid fingers and operable by thrusting means through an opening in said base plate from the opposite side of the latter; a flange secured to said base plate and extending normal thereto, said flange supporting the thrusting means for operating said movable finger; an operating lever pivoted on said flange and carrying a resilient abutment member adapted to contact the outer bottom side of a tire rim whereby to draw said base plate in a direction normal to said bottom to force all of said fingers between the inner side of the tire rim and the bead of a tire mounted thereon, the abutment member being so disposed as to abut the bottom of the rim at a point below the point of abutment of said fingers so as to dispose the thrusting means so as to operate in a position parallel to the bottom of the rim; and means for operating said thrusting means.

3. The tool as claimed in claim 2 in which the thrusting means are pneumatically operated and comprise a cylinder, a piston, and means for admitting compressed gaseous fluid into said cylinder to actuate said piston.

4. The tool as claimed in claim 2 in which the thrusting means comprises a rack on the thrusting means and a pinion meshed therewith mounted on said flange, and an operating lever for rotating said pinion.

5. The tool as claimed in claim 2 in which the thrusting means comprises an internal thread in said thrusting means and a therewith cooperating screw supported on said flange.

6. A tire-loosening tool comprising a substantially flat base plate, two spaced apart immovable fingers secured to the underside of said base plate, a downwardly movable finger positioned intermediate said fingers, means secured to the upper side of said base plate to move said movable finger in a direction at a right angle to said base plate, means pivoted to said base plate for drawing the fingers between a tire-rim and the bead of a tire mounted thereon, said means comprising a resilient abutment member and means comprising a pin to limit the pivotal movement of said pivoted member so as to permit the application of downward pressure to said base plate.

7. The tool as claimed in claim 6, in which the pivoted means comprise a handle carrying a pin abuttable against the upper side of said base plate whereby to apply downward pressure on the latter.

KEITH L. NORTHRUP.
REYNOLD T. HEDFIELD.

REFERENCES CITED

The following references are of record in the file of this patent:

UNITED STATES PATENTS

| Number | Name | Date |
|---|---|---|
| 1,059,128 | Edwards | Apr. 15, 1913 |
| 1,507,208 | Schlenker | Sept. 2, 1924 |
| 1,519,558 | Snider | Dec. 16, 1924 |
| 1,806,947 | Mjelva | May 26, 1931 |
| 1,983,608 | Hand | Dec. 11, 1934 |
| 2,281,476 | Casey | Apr. 28, 1942 |
| 2,350,034 | Herrington | May 30, 1944 |
| 2,367,638 | McCulloch | Jan. 16, 1945 |
| 2,402,022 | Corbell | June 11, 1946 |

OTHER REFERENCES

Popular Mechanics Magazine, June 1941, page 95.